United States Patent [19]
Tonar et al.

[11] Patent Number: 5,679,283
[45] Date of Patent: Oct. 21, 1997

[54] ELECTROCHROMIC LAYER AND DEVICES COMPRISING SAME

[75] Inventors: William L. Tonar; John S. Anderson, both of Holland; David A. Theiste, Byron Center, all of Mich.

[73] Assignee: Gentex Corporation, Zeeland, Mich.

[21] Appl. No.: 278,913

[22] Filed: Jul. 22, 1994

[51] Int. Cl.$^6$ .............................. G02F 1/00; G02F 1/153
[52] U.S. Cl. .................... 252/583; 359/265; 359/272; 359/273; 359/275
[58] Field of Search ........................... 252/583; 359/265, 359/272, 273, 275

[56] References Cited

U.S. PATENT DOCUMENTS

| | | | |
|---|---|---|---|
| 3,357,930 | 12/1967 | Marks et al. | 252/518 |
| 3,708,220 | 1/1973 | Meyers et al. | 350/160 R |
| 3,840,287 | 10/1974 | Witzke et al. | 350/160 R |
| 4,519,930 | 5/1985 | Kakiuchi | 252/62.2 |
| 4,761,061 | 8/1988 | Nishiyama et al. | 359/357 |
| 4,810,067 | 3/1989 | Demiryont | 350/357 |
| 4,902,108 | 2/1990 | Byker | 350/357 |
| 5,068,062 | 11/1991 | Inata et al. | 359/265 |
| 5,074,648 | 12/1991 | Warszawski | 359/265 |
| 5,078,480 | 1/1992 | Warszawski | 359/265 |
| 5,086,351 | 2/1992 | Couput et al. | 359/265 |
| 5,223,353 | 6/1993 | Ohsawa et al. | 429/192 |
| 5,274,493 | 12/1993 | Couput et al. | 359/275 |
| 5,275,750 | 1/1994 | Sato et al. | 252/62.2 |
| 5,276,547 | 1/1994 | Couput et al. | 359/270 |
| 5,300,374 | 4/1994 | Agrawal et al. | 429/192 |
| 5,327,281 | 7/1994 | Cogan et al. | 359/270 |
| 5,332,530 | 7/1994 | Eid et al. | 252/583 |
| 5,378,404 | 1/1995 | Han et al. | 252/5 |
| 5,394,264 | 2/1995 | Marchese et al. | 359/270 |

FOREIGN PATENT DOCUMENTS

| | | |
|---|---|---|
| 0 612 826 | 8/1994 | European Pat. Off. |
| 1314049 | 4/1973 | United Kingdom. |

OTHER PUBLICATIONS

Tsutsumi et al. Polymer Gel Films with Simple Organic electrochromics for Single-Film Electrochromic Devices Journal of Polymer Science, vol. 30, pp. 1725–1729 (1992).

Tsutsumi et al. Single Polymer Gel Film Electrochromic Device Electrochimica Acta, vol. 37, No. 2, pp. 369–370 (1992).

Tatistcheff Comparison of Diffusion Coefficients to Electroactive Species in Aqueous Fluid Electrolytes and Polyacrylate Gels J. Phys. Chem., vol. 97, pp. 2732–2739 (1993).

Asahi Glass Co. Ltd. Optical Modulation Using an electrochromic Material (Abstract of a Japanes Patent Application Publsihed 8 May '84), Chemical Abstracts, vol. 101, No. 140864 (1984).

Nagai et al. Gelled Electrolyte Electrochromic Material (Abstract of a Japanese Patent Application Published 11 May '88), Chemical Abstract, vol. 109, No. 119757 (1988).

Nagai et al. Gelled Electrolyte Electrochromic Materials (Abstracts of a Japanese Patent Appication Published 11 May '88), Chemical Abstracts, vol. 109, No. 119758 (1988).

Kojima et al. Preparation of Viologen–containing Polymer Gels (Abstract of a Japanese Patent Application Published 14 Sep. '89), Chemical Abstracts, vol. 112, No. 100280 (1990).

*Primary Examiner*—Philip Tucker
*Attorney, Agent, or Firm*—Brian J. Rees; William J. Scanlon

[57] ABSTRACT

The present invention provides electrochromic layers, which comprise polymeric matrices with electrochromic solutions interspersed therein. Varying an electrical potential difference across a layer of the invention results in reversible variation in the transmittance of light across the layer because of electrochemical processes in the electrochromic solution of the layer. The invention further provides electrochromic devices, in which the electrochromic layers of the invention provide reversibly variable transmittance to light, and various apparatus in which the devices of the invention provide light-filtering or light-color modulation. Such apparatus include windows, including those for use inside and on the outside walls of buildings and in sunroofs for automobiles, and variable reflectance mirrors, especially rearview mirrors for automobiles.

120 Claims, No Drawings

ELECTROCHROMIC LAYER AND DEVICES COMPRISING SAME

TECHNICAL FIELD

The present invention relates to electrochromic devices which provide light-filtering, color-modulation, or reflectance-modulation in apparatus such as variable-transmittance windows and variable-reflectance mirrors.

More particularly, the invention concerns the electrochromic medium in such an electrochromic device. The electrochromic medium undergoes a change in transmittance to light, and a concomitant change in color, when an electrical potential difference is imposed across it in the device.

The invention relates to novel electrochromic media which address a number of problems presented by electrochromic devices with electrochromic media which comprise fluids or solutions. The media of the invention occur in electrochromic devices of the invention as electrochromic layers occupying the space between electrode layers of the devices. A medium of the invention comprises a polymeric matrix, which provides a measure of structural integrity and other advantages, and an electrochromic solution, which is interspersed throughout the polymeric matrix and provides variable transmittance to light.

In addition to the novel electrochromic media and electrochromic devices of the invention, the invention relates to novel apparatus which comprise the electrochromic devices of the invention to provide light-filtering or color-modulation.

BACKGROUND OF THE INVENTION

Solution-phase electrochromic devices and various applications thereof are described in, e.g., U.S. Pat. Nos. 5,294,376, 5,280,380, 5,278,693, 5,202,787, 5,128,799, 4,902,108 (the '108 Patent), 3,806,229 and 3,451,741; European Patent Application Publication Nos. 0 012 419, 0 430 684, 0 430 686, 0 435 689 and 0 552 012; Non-emissive Electrooptic Displays, Kmetz and von Willisen, eds., Plenum Press, New York, N.Y., USA (1976), and especially the chapter therein by Chang, "Electrochromic and Electrochemichromic Materials and Phenomena," at pp. 155–196. All of these patents and other references are incorporated herein by reference.

In typical solution-phase electrochromic devices, and particularly devices which are single-compartment and self-erasing, a solution is held as a thin layer in a compartment which is formed by two walls, at least one of which is transparent to light (electromagnetic radiation of wavelength in the visible range), and spacers or sealant which separate the two walls and form the periphery of the compartment. The inner sides, those which face each other, of the two walls are each coated with an electrode layer which is in contact with the solution. An electrode layer functions as an electrode in contact with the solution and is a layer of a material which is electronically conducting. The electrode layer on at least one of the walls is transparent to light, because, as indicated above, at least one of the walls is transparent to light. Transparent electrode layers may be made of tin oxide, tin-doped indium oxide, indium tin oxide, fluorine-doped tin oxide, fluorine-doped zinc oxide, gold, cadmium stannate, ruthenium oxide, or the like, as known in the art. One of the walls and, consequently, one of the electrode layers may be non-transparent. For example, a non-transparent electrode layer might be a reflecting layer, a layer which reflects light, and may be made of a metal, semiconductor material, or the like which may or may not be specularly reflecting.

The layer of solution or other type of medium between the walls of an electrochromic device is sometimes referred to as an "electrochromic layer."

When a sufficient potential difference is applied between the electrode layers across the solution of such a device, the transmittance of the solution changes at at least one wavelength in the visible range and, as a consequence, the solution changes color, becoming darker or clearer. Typically, the solution in such a device will be clear or slightly colored (tinted) in its zero-potential, equilibrium state and will be darkened through electrochemical reaction(s) when a potential difference is applied. If the device is a solution-phase electrochromic device, the electrochromic compounds (those which have a change in transmittance in the visible wavelength range upon electrochemical oxidation (anodic electrochromic compound) or reduction (cathodic electrochromic compound) are in solution and remain in solution without precipitation upon oxidation or reduction in operation of the device.

In a single-compartment device, at least one anodic electrochromic compound and at least one cathodic electrochromic compound are together in the same compartment and are able to diffuse throughout the entire compartment (e.g., layer between the electrode layers).

In the case of a single-compartment device, self-erasing occurs, when there is no potential difference between the electrode layers, as oxidized anodic compound and reduced cathodic compound react with one another by electron transfer and both return to their zero-potential equilibrium states.

Solutions of variable transmittance in solution-phase electrochromic devices may comprise components in addition to solvent and electrochromic compounds. Such components may include inert, current-carrying electrolyte(s), thickening agents (such as, for example, non-cross-linked polymers like polymethylmethacrylate), tinting agents and UV-stabilizing agents. UV-stabilizing agents inhibit degradation of components of an electrochromic layer upon exposure of the layer to ultraviolet (UV) radiation.

The '108 Patent, among others, describes certain advantages realized by thickening or gelling solutions used in single-compartment, self-erasing, solution-phase electrochromic devices. One of the problems associated with such devices is that of segregation. When operated continuously for long periods of time, the oxidized form of the anodic and reduced form of the cathodic electrochromic materials in such devices tend to segregate. Gelling or thickening the solutions of the electrochromic device reduces the component of segregation that is due to natural convection of the electrochromic medium, thereby reducing the extent of segregation and its undesirable effects, such as uneven coloring or clearing.

Thickening or gelling the solution in electrochromic devices also creates the advantages of slower spreading of solution, restricted shattering and easier clean-up in the case of breakage of the device.

Electrochromic solutions gelled or thickened through the use of materials, such as colloidal silica or acrylic fibers, which do not involve covalent cross-linking of polymer chains, have been described. See Manos, U.S. Pat. No. 3,451,741; Shelepin et al., USSR Patent Publication No. 566,863; and the '108 Patent.

An electrochromic solution gelled or thickened with the use of a covalently cross-linked polymer matrix of 1-vinyl-2-pyrrolidinone-co-N,N',-methylbisacrylamide and used in providing color to an electrochromic device has been described. Tsutsumi et. al., J. Polymer Sci. A, 30, 1725–1729 (1992).

Thickened or gelled electrochromic solutions in the art suffer from a number of shortcomings that have restricted or prevented the practical application of electrochromic devices to provide variable transmittance or variable reflectance in a number of contexts. Perhaps the most important of these contexts is apparatus, such as windows or large outside rearview motor vehicle mirrors, where devices with solution layers of large area, more than about 0.1 m on a side, are oriented nearly vertically (i.e., nearly parallel to the lines of force of the gravitational field of the Earth) or are otherwise subjected to conditions which entail significant hydrostatic pressure and concomitant large forces pushing outwardly from the solution against the walls of the device. Thus, in these large area apparatus, hydrostatic pressure makes solution-phase electrochromic devices susceptible to breakage, for example due to rupture of seals holding walls of the electrochromic device together. Even when there is not breakage, the hydrostatic pressure causes bowing out of the walls of the electrochromic device, which results in non-uniform thickness in the solution layer and undesirably non-uniform coloring and clearing during operation of the device.

Solutions thickened by prior art methods, although thickened to the point of reducing flow, are not "free-standing" or permanent gels (see Sperling, Introduction to Physical Polymer Science, John Wiley & Sons, Inc., New York, N.Y., 2nd ed. (1992)). In free-standing (permanent) gels, solution is interspersed and entrapped in a polymer matrix and continues to function as a solution. Because solutions thickened by prior art methods (e.g., Shelepin et al., supra; '108 Patent) are not free-standing gels, the fluid in them is not entrapped in a polymer matrix and, consequently, still exerts undesirable hydrostatic pressure and concomitant device-breaking or device-distorting forces in large area devices.

It would clearly be desirable, then, to provide, as media of reversibly variable transmittance for electrochromic devices, electrochromic layers that behave as free-standing gels and that, as such, do not flow at perceptible rates and do not "weep" (leak fluid by syneresis, see Sperling, supra) but retain functional characteristics of a solution allowing for diffusion of electrochromic species. It would be especially desirable if such a layer would adhere to the electrode layers on the walls of such a device to further counteract separation of the electrode layers and walls. Further, it would be desirable if such a layer would be tough and rubbery and behave similarly to the lamination layer in laminated safety glass. Such electrochromic layers would substantially eliminate problems presented by hydrostatic pressure and the concomitant forces when solutions, and even conventionally thickened solutions, are used to provide variable transmittance in electrochromic devices.

However, electrochromic layers which would have such favorable structural, flow and electrode-layer-adherence properties would be chemically complex. Consequently it is not straightforward to provide such an electrochromic layer that retains other characteristics that are important for practical applications of media of reversibly variable transmittance in electrochromic devices, especially such devices which are desirably solution-phase, single-compartment and self-erasing.

These other characteristics, which are necessary or important for practical applications of electrochromic layers, include, without limitation, the following. Such a layer, particularly in applications such as automobile mirrors or automobile or airplane windows, should not separate into solid and fluid phases, weep, or sag subjected to vibration. Weeping and sagging should also be avoided in other applications, such as interior or exterior building windows. The electrochromic layer should not be hazy or cloudy. The compositions, which are part of the electrochromic layer and afford the layer its favorable structural, flow and adherence characteristics, must not be involved in undesirable interactions with other components of the layer. For example, the cycle life of the layer should not be seriously degraded by constituents of the polymer matrix. Also, if an initiator or a catalyst is employed in making a polymer that is part of the layer, the initiator or catalyst should not undergo reactions with electrochromic compounds in the layer, in their zero-potential equilibrium or electrochemically activated (reduced or oxidized) states. If a polymer is part of the electrochromic layer and involved in an interaction with the electrode layers that causes the electrochromic layer to adhere to the electrode layers, the polymer should not significantly interfere with the function of the electrode layer in electron transfer to or from electrochromic species in the layer. The compositions which provide the desirable structural, flow and adherence characteristics to the electrochromic layer should not cause the layer to be so unstable to ultraviolet (UV) radiation that the layer cannot be made sufficiently stable by other measures, such as addition of UV-stabilizing agents to the solution in the layer. The compositions which provide the desirable structural, flow and adherence characteristics to the electrochromic layer should not interfere with the coloring and clearing times of a device to an extent that would render use of the device impractical. The compositions which provide the desirable structural, flow and adherence characteristics to the electrochromic layer should not significantly complicate construction or assembly of an electrochromic device in which the layer provides reversibly variable transmittance. Thus, for example, it would be desirable to be able to fill a device with all components of an electrochromic layer, including those that afford the favorable structural, flow and adherence characteristics, before the layer loses its ability to flow. Finally, the reactions to provide an electrochromic layer its favorable structural, flow and adherence properties should be completed soon after the reactions are started. For example, it is undesirable to have significant polymer formation continuing in an electrochromic layer inside a device for more than a few days, because the layer may shrink with time or the performance characteristics (e.g., color in the clear state, coloring and clearing times, uniformity of coloring) of the layer and the device that includes the layer would then undesirably change over time.

The present invention fills a need in the art for an electrochromic layer which has the advantageous structural, flow and electrode-layer-adherence properties described above for use of the layer to provide variable transmittance or reflectance in a large-area electrochromic device and, at the same time, has other characteristics which make the layer acceptable for practical applications in single-compartment, self-erasing electrochromic devices that also function as solution-phase devices.

SUMMARY OF THE INVENTION

The present invention provides an electrochromic layer of reversibly variable transmittance to light which comprises:

(a) a polymer matrix of a polyol polymer wherein the polyol polymer chain molecules ("chains") are covalently cross-linked through hydroxyl groups; and (b) an electrochromic solution which comprises an anodic and a cathodic electrochromic compound interspersed in the polymer matrix.

Surprisingly, the electrochromic layers of the invention are free-standing gels ("permanent" gels) in which the electrochromic solution is interspersed or dissolved in the polymer matrix. The electrochromic solution has the electrochromic compounds and possibly other components (e.g., thickeners, UV-stabilizers, inert current-carrying electrolyte) dissolved in a solvent and functions as a solution notwithstanding being interspersed in the polymer matrix.

Because they are free-standing gels and surprisingly, in many cases, do not significantly weep, the electrochromic layers of the invention avoid problems due to hydrostatic pressure of fluids in large-area electrochromic devices in which the layers of the invention are the media of reversibly variable transmittance.

The electrochromic layers of the invention surprisingly adhere strongly to the electrode layers of the devices in which the electrode layers are the media of reversibly variable transmittance and, also surprisingly, in such adherence do not interfere significantly with the electron transfer functions of the electrode layers.

Also, unexpectedly, the electrochromic layers of the invention have many of the other characteristics, which are necessary or important for practical applications of electrochromic layers as media of reversibly variable transmittance in electrochromic devices. The layers form rapidly. They are generally easily made in situ inside a device after filling a device with a precursor fluid. The polymer matrix surprisingly does not impede coloring or clearing to an extent that poses a problem for practical applications of the electrochromic layers. The reagents used in forming the polymer matrix surprisingly do not interact with components of the electrochromic solution to an extent that precludes practical, commercial applications of the electrode layers. The interactions between the polymer matrix and its low molecular weight precursors and solvents of the electrochromic solution, especially propylene carbonate and other cyclic ester solvents, are surprisingly favorable. This serves to avoid precipitation of polymer matrix precursors before the polymer matrix can be formed, serves to maintain the integrity and open structure of the polymer matrix which, in turn, limits interference of the matrix with the interspersed solution and phenomen occurring therein, serves to hold the solvent inside the matrix and thereby usually avoid weeping (syneresis), and serves usually to avoid haziness or cloudiness in the layer. The layers of the invention have other favorable characteristics as well.

The invention also provides electrochromic devices, which comprise electrochromic layers of the invention as the media of reversibly variable transmittance, and apparatus, such as variable transmittance windows and variable reflectance mirrors, which comprise electrochromic devices of the invention as the component that provides reversibly variable transmittance.

ADDITIONAL DETAILS OF THE INVENTION

For many details of the invention, reference may be had to the various disclosures incorporated herein by reference, and especially the '108 Patent and U.S. Pat. Nos. 5,202,787, 5,278,693, 5,280,380, and 5,294,376.

For synthesis of preferred cathodic electrochromic compounds for use in the invention, and various salts thereof, reference may be had to U.S. Pat. No. 5,294,376 and Example 1 below. Preferred among these cathodic compounds are salts, preferably the difluoroborate salt, of a dication selected from the group consisting of N, N'-substituted dipyridyls with hydrogen at all of the 2, 2', 6, and 6' positions and with the N and N' substituents being the same or different and each being selected from the group consisting of alkyl groups of 1–10 carbons, phenyl, benzyl, 2-phenylethyl, 3-phenyl(n-propyl), and 4-phenyl(n-butyl) and N, N'-substituted dipyridyls with an alkyl group of 1–4 carbons at each of the 2, 2', 6, and 6' positions and with the N and N' substituents being the same or different and each being selected from the group consisting of alkyl groups of 1–10 carbons, benzyl, 2-phenylethyl, 3-phenyl(n-propyl), and 4-phenyl(n-butyl). Most preferred among these is 1,1'-di(3-phenyl(n-propyl))-4,4'-dipyridinium.

Preferred among the anodic electrochromic compounds are 5,10-dihydro-5,10-dimethylphenazine, N,N,N', N'-tetramethyl-p-phenylene-diamine, N,N,N', N'-tetraphenyl-p-phenylene-diamine, bis-3,3'-diethyl-2, 2'-benzothiazole azine, and tetrathiafulvalene. Most preferred is 5,10-dihydro-5,10-dimethylphenazine.

For tinting of electrochromic solutions, see especially U.S. Pat. No. 5,278,693.

For UV-stabilizing agents, see especially U.S. Pat. No. 5,280,380. Most preferred is ethyl 2-cyano-3, 3-diphenyl acrylate.

The most preferred solvent for use in the electrochromic solutions of the electrochromic layers of the invention is propylene carbonate. Other solvents are acceptable, and among these cyclic esters are preferred, such as propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, and gamma-valerolactone with ethylene carbonate.

The polymer matrices of electrochromic layers according to the invention entail polyols with hydroxyl functionalities of at least 2, i.e., polymer molecules with at least two hydroxyl groups that can react with other functional groups, such as, among others, isocyanate groups, metal alkoxide groups, or ketene groups.

In the polymer matrices, the polyols are crosslinked by molecules of a bridging compound, which in turn have at least two functional groups that can react with the reactive hydroxyls of the polyols.

As the skilled will understand, in order to form a polymer matrix, i.e. a polymer in which linear chains are covalently cross-linked, it is necessary that either the polyol has an hydroxyl functionality of greater than 2 or the bridging compound has a group which can react with the reactive hydroxyls of the polyol to form a covalent bond and which has a functionality greater than 2.

Preferred among the polyols which can be employed to form the polymer matrices of the electrochromic layers of the invention are polyester polyols, such as Desmophen 1652 (made by Miles, Inc., average molecular weight 2000 daltons, hydroxyl functionality 2,made with diethylene glycol, ethylene glycol, 1,4-butane diol, and adipic acid), Desmophen 1700, and Desmophen R-18A (made by Miles, Inc., average molecular weight 2500 daltons, hydroxyl functionality approximately 2.7, made from diethylene glycol, trimethylol propane, and adipic acid); polyacrylate polyols, such as the polyol made by polymerizing the caprolactone acrylate SR-495; and polyether polyols, such as Desmophen 550U (made by Miles, Inc., average molecular weight 440 daltons, hydroxyl functionality 3,made from propylene oxide and started on trifunctional material), Desmophen 1600U (made by Miles Inc., average molecular weight 1000 daltons, hydroxyl functionality 2, made from propylene oxide and started on difuntional material), Desmophen 1900U (made by Miles, Inc., same as Desmophen 1600U except average molecular weight of 2000 daltons), and Desmophen 1915U.

To crosslink the polyols, preferred are compounds with isocyanate groups (to form a type of "polyurethane"), such as Desmodur N-100 or Desmodur 3300-N; bisketenes, and metal alkoxides, such as tetramethyl or tetraethyl orthosilicate or titanium(IV) isopropoxide.

The amount of polymer matrix present in the electrochromic layers of the invention is preferably from about 50% by weight of the layer down to the percentage at which a free-standing gel is barely formed with the electrochromic solution at room temperature. This lower limit is easily ascertained by routine experimentation by simply making a series of compositions that vary in weight fraction of components to make the matrix to ascertain the weight fraction that is required form free-standing gel formation at room temperature. Typically, for example, with polyacrylate polyols made with SR-495 caprolactone acrylate, the polymer matrix will need to be at least 5 wt. % of the electrochromic layer. With Desmophen 1700, typically at least about 20 wt. % of the electrochromic layer will need to be polymer matrix material.

The invention is described in somewhat more detail in the following, non-limiting examples. "Room temperature" means 20° C.–27° C., typically 23° C.–25° C. Unless otherwise specifically noted, all volumes and concentrations described herein are at room temperature.

EXAMPLE 1

Synthesis of 1,1'-di(3-phenyl(n-propyl))-4,4'-dipyridinium difluoroborate

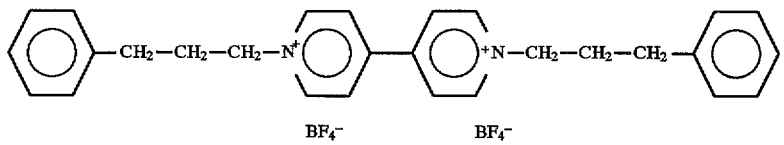

BF$_4^-$    BF$_4^-$

The compound was made starting with the known compounds, 4,4'-bipyridine and 1-bromo-3-phenylpropane, of formulas

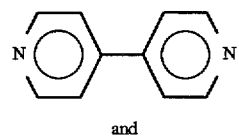

and

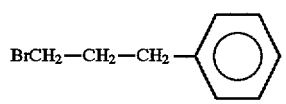

respectively. A solution of 10 g of 4,4-bipyridine and 38.9 ml of 1-bromo-3-phenylpropane was dissolved in 150 ml of acetonitrile. The solution was refluxed for about 24 hours. The yellow precipitate was filtered off by vacuum filtration. The precipitate was then slurried in an excess of acetone and again vacuum filtered. The yellow precipitate was then dried at 60° C.

The dried, yellow precipitate was dissolved in 600 ml of warm water and the solution was carbon treated and filtered. To this solution an aqueous solution of sodium fluoroborate was added to provide a slight excess of fluoroborate ions. The solution was heated to about 90° C. and was treated with carbon. The hot solution was filtered and cooled.

Upon cooling, white crystals and yellow precipitate formed which were separated by filtration. The solids were recrystallized from water with carbon treatment to yield a white precipitate. This precipitate was collected and dried to give 22.8 grams of the desired product (62.7% yield). The elemental analysis was as follows:

| Found: | C 58.7 | H 5.4 | N 4.9 | F 21.7 | B 4.7 |
| Calculated: | C 59.2 | H 5.3 | N 4.9 | F 26.8 | B 3.8 |

EXAMPLE 2

Electrochromic Layer Comprising a Polymer Matrix from Polyester Polyol Chains Joined by Isocyanates Reacting with Hydroxyls An electrochromic layer comprising a polymer matrix made by linking polyester polyol chains through hydroxl groups of the chains was prepared as follows. 8.0 g of 0.08 M 1,1'-dibenzyl-2,2', 6,6'-tetramethyl-4, 4'-bipyridinium difluoroborate in propylene carbonate, 8.0 g 0.08 M 5,10-dihydro-5,10-dimethylphenazine in propylene carbonate, 3.52 g of Desmophen 1700 (a polyester polyol sold by Miles, Inc., Pittsburgh, Pa., USA, made from adipic acid and diethylene glycol, having an average molecular weight of 2550 daltons and an hydroxyl functionality of 2) and 0.48 g of Desmodur N-100 (a polymer of hexamethylene diisocyanate comprising biuret groups, having an isocyanate functionality near 3,sold by Miles Inc.) and one drop of catalyst (dibutyltin dilaurate, Aldrich, Milwaukee, Wis.) were mixed in a glass vial. The electrochromic layer was gelled by baking the vial at 75° C. for 1 hr. An electrochromic layer with a covalently cross-linked, covalently-bonded polymer matrix formed which was transparent to visible light. The layer shows no signs of weeping.

A solution with the composition of that described in the preceding paragraph was prepared and used to fill a device which was approx. 2 in. × approx. 10 in. in cross-section. The device was single-compartment and self-erasing (see the '108 Patent). The electrode layers of the electrode-layer-bearing walls of the device were transparent, made of fluorine-doped tin oxide, had a sheet resistance of about 20 ohms per square, were substantially planar and parallel (like the sheets of glass to which they were adhered), and were spaced apart by about 0.0125 cm by a perimeter seal. The device was vacuum filled with the solution through a small gap in the perimeter seal and after filling the small gap was plugged with a UV-cure adhesive.

The electrochromic layer was then gelled by heating the device at 75° C. for 1 hr.

EXAMPLE 3

Antiscattering Qualities of an Electrochromic Layer Comprising a Polymer Matrix from Polyester Polyol Chains Joined by Isocyanates Reacting with Hydroxyls An electrochromic device containing a polyurethane electrochromic layer was prepared as follows. 48.0 g of 0.08 M 1,1'-dibenzyl-2,2', 6,6'-tetramethyl-4, 4'-bipyridinium difluoroborate in propylene carbonate, 48.0 g 0.08 M 5,10-dihydro-5,10-dimethylphenazine in propylene carbonate, 21.12 g of Desmophen 1700, 2.88 g of Desmodur N-100, and 2 drops of catalyst (dibutyltin dilaurate, Aldrich, Milwaukee, Wis.) were mixed together and used to fill an electrochromic mirror as detailed in Example 2. Then polymer matrix formation (gelling) was carried out by heating to 85° C. for 25 minutes.

Adhesive tape was placed on the back of the mirror. A 1 kg metal sphere was dropped on the mirror from a height of approximately 1 m. Inspection revealed that no electrochromic solution had leaked from the broken mirror and there was no evidence that the glass fragments had become separated from the electrochromic layer.

Additionally, two complete interior automobile rearview mirrors containing the above described electrochromic layer were constructed and tested. The mirrors were subjected to simulated crash testing (General Motors specification test) with no sign of solution leakage or separated glass fragments. The shards of both pieces of glass adhered strongly to the electrochromic layer, and could only be separated with difficulty after impact testing.

EXAMPLE 4

Solution-Phase Electrochromic Device Comprising an Electrochromic Layer Comprising a Polymer Matrix from Polyester Polyol Chains Joined by Isocyanates Reacting with Hydroxyls An electrochromic solution of 15 g 0,080 M 1, 1'-di(3-phenyl(n-propyl))-4,4'-dipyridinium difluoroborate in propylene carbonate, 15 g of 0.080 M 5,10-dihydro-5,10-dimethylphenazine in propylene carbonate, 8.68 g Desmophen 1700, 1.08 g Desmodur N-3300 (a polymer of hexamethylene diisocyanate based on an isocyanurate ring of 3 hexamethylene diisocyanate molecules, having an isocyanate functionality of approximately 3,sold by Miles, Inc.) and one drop of dibutyltin dilaurate (Aldrich Chemical Company, Inc., Milwaukee, Wis.) were placed in an electrochromic device constructed according to previous examples and afterwards the device was sealed.

The device was baked at 80° C. for 1 hour to gel the electrochromic layer.

The device with the gelled electrochromic layer initially had a transmittance of 79% in the clear (zero-potential equilibrium) state. After 55,000 cycles at 70° C. (each cycle being 30 seconds on at 1.2 V DC potential difference across the electrochromic layer followed by 30 seconds off (short circuit between electrode layers)), the transmittance in the clear state was still slightly more than 63%.

EXAMPLE 5

Solution-Phase Electrochromic Device Comprising an Electrochromic Layer Comprising a Polymer Matrix Made from Polyacrylate Polyol Chains Joined by Isocyanates Reacting with Hydroxyls and Present at Low Weight Percent of the Layer A stock solution of 10 weight percent of a high molecular weight polyol was prepared as follows. 225 g of propylene carbonate, 25 g SR-495 caprolactone acrylate monomer (Sartomer Co., West Chester, Penn., U.S.A.), formula:

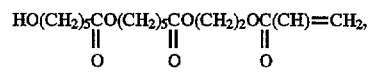

and 1 g azothermal initiator (V-601) (dimethyl 2, 2'-azobis (2-methylpropionate), Wako Chemicals U.S.A., Inc., Richmond, Virginia, U.S.A.) were added to a three-neck round bottom flask and heated to 120° C. while stirring for 4 hours under a nitrogen atmosphere.

To the approximately 250 g of polymer solution, 5.68 g of 1,1'-di(3-phenyl(n-propyl))-4,4'-dipyridinium difluoroborate and 2.10 g 5,10-dihydro-5, 10-dimethylphenazine were stirred in and dissolved at room temperature.

To 5 g of the resulting solution, 2.5 g of 0.08 M 1,1'-di (3-phenyl(n-propyl))-4,4'-dipyridinium difluoroborate in propylene carbonate, and 2.5 g of 0.08 M 5,10-dihydro-5, 10-dimethylphenazine in propylene carbonate were added to lower the total caprolactone acrylate monomer concentration to 5 weight percent. To this was added 0.15 g isophorone diisocyanate (5-isocyanato-1-(isocyanatomethyl)-1,3, 3-trimethylcyclo-hexane)(Aldrich Chemical Co., Inc., Milwaukee, Wis., U.S.A.) and 1 drop dibutyl tin dilaurate (Aldrich Chemical Co.) as catalyst.

The solution was inserted into 1×2 inch electrochromic windows, prepared as in Example 2, and the window perimeter was then sealed. The windows were baked at 100° C. for 1 hour to form the polymer matrix of the electrochromic layer. The coloring and clearing speeds of this low polymer weight percent composition approached those of electrochromic devices without the polymer matrix, despite the fact that the composition was a free-standing system of polymer matrix with interspersed electrochromic solution.

In this system, some weeping and cloudiness of the electrochromic layer were observed.

EXAMPLE 6

Haze-Free, Non-Weeping Electrochromic Layer with UV Stabilizer

A 250 g 10-weight percent stock solution of high molecular weight SR-495 (Sartomer Co.) polyol was prepared as in Example 5. To 125 g of this stock solution, 16 g of the UV-stabilizer Viasorb 910 (ethyl 2-cyano-3,3-diphenyl acrylate) (Aceto Corporation, Flushing, N.Y.) and 2.1 g of 5, 10-dihydro-5,10-dimethylphenazine were dissolved into solution by stirring. To an additional 125 g of this stock solution, 16 g of Viasorb 910 and 5.7 g of 1, 1'-di (phenylpropyl)-4,4'-dipyridinium difluoroborate were dissolved into solution by stirring.

The electrochromic layer was prepared as follows: 20 g of each of the above solutions were mixed together along with 0.4 g of isophorone diisocyanate (Aldrich Chemical Co.) and three drops of dibutyl tin dilaurate (Aldrich Chemical Co.). 2 in.×10 in. electrochromic devices with a 0.0137 cm spacing between the electrode layers were filled with the above electrochromic layer material and the electrochromic layer was gelled by being held at 90° C. for one hour. The resulting electrochromic layer, comprising about 10% by weight of polymer matrix, was non-flowing, non-weeping, haze-free and remarkably stable during cycling for 73,000 cycles of 30 sec. on (1.2 V DC between electrode layers)/30 sec. off (short circuit between electrode layers) at 70° C. During these 73,000 cycles, the clear-state transmittance started at 78% and degraded to only 69%.

Electrochromic layer material made as described in the previous paragraph was also used to fill an electrochromic mirror element, in which the electrochromic device was the same as the one described in the previous paragraph (fluorine-doped tin oxide electrode layers, 22 ohm per square sheet resistance, 0.0137 cm spacing between electrode layers), and the polymer matrix was formed in the material by holding the element at 90° C. for an hour. After formation of the matrix, reflectance from the element was measured. The reflectance was 74% at zero-potential equilibrium. When 1.2 V DC was applied between the electrode layers and across the electrochromic layer, the reflectance decreased to 10% in 7.5 seconds and to 7% in 15 seconds. When the electrode layers were short-circuited, the reflectance increased from 7% to 74% in 30 seconds and from 10% to 60% in 11.5 seconds.

EXAMPLE 7

Large Area Electrochromic Device with an Electrochromic Layer with Substantially No Hydrostatic Flow A large area device that acted as a variable transmittance light filter or window was constructed to show the advantage of an electrochromic layer with substantially no hydrostatic flow. The device was constructed with two 42×44 inch sheets of fluorine doped tin-oxide coated glass with a sheet resistance of 22 ohms per square, separated by a primary seal made of 0.075 inch thick polyisobutylene with a rigid UV curable adhesive material to create a secondary seal to help maintain the shape of the primary seal.

The window was filled with a solution consisting of 1100 ml 0.01 M benzyl viologen difluoroborate (difluoroborate (($BF_4^-$)$_2$) salt of 1,1'-dibenzyl-4, 4'-dipyridinium) in propylene carbonate, 1100 ml 0.01 M 5,10-dihydro-5,10-dimethylphenazine in propylene carbonate, 387.2 g Desmophen 1700, 52.8 g Desmodur N-100, and 1 ml dibutyltin diacetate (Aldrich Chemical Co.) using nitrogen pressure to force the fluid into the window through a ⅜ inch inlet tube connected to a fill hole at one corner of one of the walls. Air exited the window through a separate fill hole at the opposite corner of the same wall.

After 64 hours, a sample of the electrochromic layer materials that had been retained in a sealed vial had gelled. Careful examination of the electrochromic layer near the fill holes of the device indicated that the layer materials in the device had gelled as well. The fill holes were then sealed with a UV-cure adhesive.

The window was placed in an upright position and contact clips were applied around the perimeter of both electrode layers and a potential difference of 1.2 V DC was applied between the transparent conductive electrodes. The window achieved a transmission of less than five percent after a period of 20 minutes. When the potential difference between the electrode layers was removed, the transmission returned to its original value of greater than seventy percent. The window showed remarkable coloring uniformity and no evidence of fluid flow toward the bottom.

The window was then darkened for 64 hours with a 1.2 V potential. The potential was then removed and the window cleared with no sign of segregation.

The window showed no problems due to the high force resulting from hydrostatic pressure.

EXAMPLE 8

Polymer Matrix from Polyester Polyol and Ketene 9,10-hydroanthracene-9,10-bisketene was prepared as described by Blomquist, J. Amer. Chem. Soc. 79, 2021 (1957).

The following solutions were made:

Solution A: 1.0 gm of 80 mM 5, 10-dihydro-5,10-dimethylphenazine in propylene carbonate, 0.26 gm of the polyester polyol sold by Miles, Inc. as Desmophen R-18A (average molecular weight 2500 daltons, hydroxyl functionality of approximately 2.7, made from adipic acid, trimethyol propane, and diethylene glycol).

Solution B: 1.0 gm of 80 mM N, N'-di(3-phenyl(n-propyl)) bipyridinium difluoroborate in propylene carbonate, 0.26 gm of the polyester polyol sold by Miles, Inc. as Desmophen R-18A.

To solution A, 0.17 gm of bisketene crystals were stirred in until the solution began to gel, whereupon all of Solution B was added. The resulting solution was stirred well and set up to become a gel (free-standing, polymer matrix—electrochromic solution system).

Some of the resulting gel was placed between two tin oxide electrode layers on glass and 1.2 V of DC potential was applied across the gel. The gel layer colored and cleared quickly. No weeping was observed from the gel. Advantageously, in addition, no catalyst to initiate polymerization is required in this system.

EXAMPLE 9

Polymer Matrix from Polyacrylate Polyol with Hydroxyls Joined Using a Silicon Alkoxide A high molecular weight polyacrylate polyol solution was prepared as follows: 15 wt. % SR-495 with 0.04 wt. % V601 initiator in propylene carbonate were stirred at 120° C. for 3 hours with He being bubbled through the solution. To this solution, 5, 10-dihydro-5,10-dimethylphenazine and N,N'-di(3-phenyl(n-propyl)) bipyridinium difluoroborate were added to make the solution 40 mM in both.

To 10 gm of the resulting solution, 1 drop (approx. 0.025 gm) of dibutyl tin dilaurate and 0.4 gms of tetramethyl orthosilicate ($Si(OCH_3)_4$) were added. This solution was used to fill an electrochromic device through a small hole near one end of one of the glass plates while air was allowed to escape through another small hole at the other end of the same glass plate. The holes were then plugged with polyamide hot-melt adhesive, and the device was then baked at 80° for approximately 1 hour, whereupon a polymer matrix formed. The device colored readily upon application of 1.2 V DC across the electrochromic layer, and cleared readily when short-circuited or open-circuited.

EXAMPLE 10

Electrochromic Layer with Polymer Matrix of Crosslinked Polyether Polyol 16.4 g of the polyether polyol Desmophen 1915U (sold by Miles, Inc., average molecular weight 4800 daltons, made with propylene and ethylene oxides starting on trifunctional material, hydroxyl functionality of 3), 1.90 g of Desmodur N-100, and 1 drop of dibutyl tin dilaurate (Aldrich) were mixed into a homogenous mixture. 4 g of this mixture was then combined with 8 g of 80 mM benzyl viologen difluoroborate in propylene carbonate and 8 g of 80 mM 5,10-dihydro-5,10-dimethylphenazine in propylene carbonate and the resulting mixture was stirred until a haze-free solution resulted.

The electrochromic device of an electrochromic mirror element like that described in Example 6 was vacuum filled with the resulting electrochromic layer precursor solution, the end-hole in the perimeter seal through which the device had been filled was plugged with a UV-cure adhesive, and the device was baked at 85° C. for 30 min. to form the polymer matrix.

When 1.2 V DC was applied between the electrode layers and across the electrochromic layer of the device, the reflectance from the mirror element decreased from the zero-potential equilibrium value of 71% to a low of 7%. When the electrode layers were short-circuited, the reflectance returned to 71%. The clearing back to 71% reflectance from 7% reflectance required about 3 seconds longer than such clearing in similar devices without the polymer matrix.

EXAMPLE 11

Electrochromic Layers with Various Solvents

The electrochromic layers described in this Example, involving a variety of solvents and solvent mixtures, were made and tested. The layers were found to provide electrochromically active layers that advantageously are non-weeping and non-cloudy.

A) To 0.48 grams Desmodur N-3300 and 3.52 grams Desmophen 1700, 6 grams of 32 mM of phenylpropyl viologen difluoroborate (1,1'-di(3-phenyl (n-propyl))-4,4'-dipyridinium difluoroborate) and 32 mM DMP (5,10-dihydro-5,10-dimethylphenazine) in propylene carbonate and 1 drop (approximately 0.025 grams) of dibutyl tin dilaurate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 4 hours at 80° C. to form a non-weeping, non-cloudy free-standing electrochromic layer material. When 1.2 volts DC potential difference was applied across the electrochromic layer in the device, the device decreased in transmission. The device returned to the clear state when the potential difference was removed.

B) The experiment in part A of this example was repeated with a mixture of 30% by weight ethylene carbonate and 70% by weight propylene carbonate in place of propylene carbonate alone as solvent. As in part A, both the fluid in the device and that in the vial gelled in less than 4 hours at 80° C. to form a non-weeping, non-cloudy electrochromic layer material. Also as in part A, when 1.2 volts DC potential difference was applied across the electrochromic layer in the device, the device decreased in transmission and then returned to the clear state when the potential difference was removed.

C) The experiment in part A of this example was repeated with a mixture of 30% by weight isobutylene carbonate and 70% by weight propylene carbonate in place of propylene carbonate alone as solvent. As in part A, both the fluid in the device and that in the vial gelled in less than 4 hours at 80° C. to form a non-weeping, non-cloudy electrochromic layer material. Also as in part A, when 1.2 volts DC potential difference was applied across the electrochromic layer in the device, the device decreased in transmission and then returned to the clear state when the potential difference was removed.

D) The experiment in part A of this example was repeated with gamma butyrolactone alone in place of propylene carbonate alone as solvent. As in part A, both the fluid in the device and that in the vial gelled in less than 4 hours at 80° C. to form a non-weeping, non-cloudy electrochromic layer material. Also as in part A, when 1.2 volts DC potential difference was applied across the electrochromic layer in the device, the device decreased in transmission and then returned to the clear state when the potential difference was removed.

E) To 0.48 grams Desmodur N-3300 and 3.52 grams Desmophen 1700, 6 grams of 16 mM phenylpropyl viologen difluoroborate and 16 mM EBTA (bis-3, 3'-diethyl-2,2'-benzothiazole azine) in gamma valerolactone and 1 drop (approximately 0.025 grams) of dibutyl tin dilaurate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 4 hours at 80° C. to form a non-weeping, non-cloudy, free-standing electrochromic material. When 1.2 volts DC potential difference was applied across the electrochromic layer in the device, the device decreased in transmission and then returned to the clear state when the potential difference was removed.

F) To 0.48 grams Desmodur N-3300 and 3.52 grams Desmophen 1700, 6 grams of 32 mM phenylpropyl viologen difluoroborate and 32 mM DMP in acetonitrile and 1 drop (approximately 0.025 grams) of dibutyl tin diacetate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 2 hours at 50° C. to form a non-weeping, non-cloudy, free-standing electrochromic layer material. When 1.2 volts DC potential difference was applied across the electrochromic layer in the device, the device decreased in transmission and then returned to the clear state when the potential difference was removed.

G) To 0.48 grams Desmodur N-3300 and 3.52 grams Desmophen 1700, 6 grams of 32 mM phenylpropyl viologen difluoroborate and 32 mM DMP in propionitrile and 1 drop (approximately 0.025 grams) of dibutyl tin diacetate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 2 hours at 80° C. to form a non-weeping, non-cloudy, free-standing electrochromic layer material. When 1.2 volts DC potential difference was applied across the electrochromic layer in the device, the device decreased in transmission and then returned to the clear state when the potential difference was removed.

H) To 0.48 grams Desmodur N-3300 and 3.52 grams Desmophen 1700, 6 grams of 32 mM phenylpropyl viologen difluoroborate and 32 mM DMP in glutaronitrile and 1 drop (approximately 0.025 grams) of dibutyl tin diacetate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 2 hours at 80° C. to form a non-weeping, non-cloudy, free-standing electrochromic layer material. When 1.2 volts DC potential difference was applied across the electrochromic layer in the device, the device decreased in transmission and then returned to the clear state when the potential difference was removed.

I) To 0.48 grams Desmodur N-3300 and 3.52 grams Desmophen 1700, 6 grams of 32 mM phenylpropyl viologen difluoroborate and 32 mM DMP in dimethyl formamide and 1 drop (approximately 0.025 grams) of dibutyl tin diacetate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 2 hours at 80° C. to form a non-weeping, non-cloudy, free-standing electrochromic material. When 1.2 volts DC potential difference was applied across the electrochromic layer in the device, the device decreased in transmission and then returned to the clear state when the potential difference was removed.

J) To 0.48 grams Desmodur N-3300 and 3.52 grams Desmophen 1700, 6 grams of 32 mM phenylpropyl viologen difluoroborate and 32 mM DMP in dimethyl sulfoxide and 1 drop (approximately 0.025 grams) of dibutyl tin diacetate were added. From this mixture (40% by weight polymer matrix materials and 60% by weight solvent containing electrochromic materials and catalyst) solution was taken and used to fill a 1 in.×2 in. transparent electrochromic device. Both the fluid in the device and that in the vial gelled in less than 2 hours at 80° C. to form a non-weeping, non-cloudy, free-standing electrochromic layer material. When 1.2 volts DC potential difference was applied across the electrochromic layer in the device, the device decreased in transmission and then returned to the clear state when the potential difference was removed.

EXAMPLE 12

Effects of Polymer Matrix on Coloring and Clearing Speeds of Electrochromic Layers Tests were conducted of the effects of the amount of polymer matrix on the coloring and clearing speeds of electrochromic devices which comprise as the medium of variable transmittance an electrochromic layer comprising the matrix.

Electrochromic devices with the size and shape of automobile inside rearview mirror elements, approximately 2 in.×10 in. in cross-section and with fluorine-doped tin oxide electrodes spaced apart by a distance of 0.0125 cm were each filled with one of a variety of electrochromic-layer-precursor solutions made up from a blend of the matrix-forming materials, which consisted of 88% by weight Desmophen 1700, 12% by weight Desmodur N-100 and a trace (about 0.5%) of dibutyltin dilaurate, with various amounts of the electrochromic compounds, (benzyl viologen difluoroborate) and 5,10-dihydro-5,10-dimethylphenazine, dissolved in propylene carbonate. The solutions were made up so that the final concentration of each of the electrochromic compounds was 0.032 molar and the weight percentage of the blend that was matrix-forming materials varied as follows: 19%, 33%, 40%, 44% or 47%. After being filled with precursor solutions, the devices were plugged and then heated at 80° C., which caused the polymer matrices, and thereby the electrochromic layers, to form (gel) within the devices.

The devices with the electrochromic layers comprising polymer matrices were compared with a device which was filled with 0.032 molar of each of the electrochromic compounds in propylene carbonate without any matrix-forming materials.

The time was determined for the reflectance of each of the devices to change from the zero-potential equilibrium reflectance (high reflectance) to the lowest reflectance achieved (low reflectance) after 1.2 volts DC was applied between the electrodes and across the electrochromic layer (with polymer matrix) or solution (without polymer matrix). This time is referred to as the coloring time of the device. In Table I, the coloring times are listed with the percentages by weight of matrix-forming materials for the devices.

TABLE I

| Percentage by Weight of Matrix-forming Materials | Coloring Time (sec) |
| --- | --- |
| 0 | 12 |
| 19 | 12 |
| 33 | 15 |
| 40 | 18 |
| 44 | 20 |
| 47 | 24 |

In all cases, the high reflectance was about 73% and the low reflectance was about 7%. The polymer matrix had no significant effect on the high and low reflectances.

Surprisingly the coloring time or, alternatively, the "coloring speed" is substantially unaffected by the percentage of polymer matrix present in the electrochromic layer of the device up to at least about 45% by weight.

The time was also determined for the reflectance of each of the devices to change from the lowest reflectance achieved (low reflectance) with 1.2 volts DC applied between the electrodes and across the electrochromic layer (with polymer matrix) or solution (without polymer matrix) to 75% of the zero-potential equilibrium reflectance (high reflectance) after the electrodes were short-circuited. In Table II, these "75%-clearing times" are listed with the percentages by weight of matrix-forming materials for the devices.

TABLE II

| Percentage by Weight of Matrix-forming Materials | 75%-Clearing Time (sec) |
| --- | --- |
| 0 | 12 |
| 19 | 15 |
| 33 | 27 |
| 40 | 34 |
| 44 | 41 |
| 47 | 50 |

Clearing time or, alternatively, "clearing speed" is affected more than coloring time/coloring speed by the percentage of polymer matrix present in the electrochromic layer of a device. However, the clearing speed surprisingly is still acceptable for practical use of the tested devices in many applications even at polymer-matrix percentages up to about 30 wt.% and would be acceptable for use of the devices in some applications at even higher polymer-matrix percentages.

We claim:

1. An electrochromic layer of reversibly variable transmittance to light which comprises:

(a) a polymer matrix of a polyol polymer which has an hydroxyl functionality of at least 2 and wherein the polyol polymer chains are covalently cross-linked through hydroxyl groups; and (b) an electrochromic solution which comprises an anodic and a cathodic electrochromic compound interspersed in the polymer matrix.

2. An electrochromic layer according to claim 1 wherein the polyol polymer is a polyester polyol.

3. An electrochromic layer according to claim 2 wherein the polyester polyol is selected from the group consisting of polyester polyols made from diethylene glycol and adipic acid, and polyester polyols made from diethylene glycol, adipic acid and trimethylol propane.

4. An electrochromic layer according to claim 1 wherein the polyol polymer is a polyacrylate polyol.

5. An electrochromic layer according to claim 4 wherein the polyacrylate polyol is a polymer formed from a mono hydroxy caprolactone-monoacrylate.

6. An electrochromic layer according to claim 1 wherein the polyol polymer is a polyether polyol.

7. An electrochromic layer according to claim 6 wherein the polyolether polyol is made from propylene oxide and ethylene oxide started on a trifunctional material.

8. An electrochromic layer according to claim 1 wherein the polyol polymer chains are cross-linked by reaction with a compound selected from the group consisting of a polyisocyanate with an isocyanate functionality of at least 2, a metal alkoxide with an alkoxide functionality of at least 2, and a bisketene, provided that, if the hydroxyl functionality of the polyol polymer is 2, the reaction is with a compound selected from the group consisting of a polyisocyanate with an isocyanate functionality of more than 2, a metal trialkoxide and a metal tetraalkoxide.

9. An electrochromic layer according to claim 8 wherein the polyol polymer chains are cross-linked by reaction with a polyisocyanate.

10. An electrochromic layer according to claim 9 wherein the polyisocyanate is selected from the group consisting of isophorone diisocyanate, a polyisocyanate containing biuret groups, and a polyisocyanate containing an isocyanurate ring.

11. An electrochromic layer according to claim 10 wherein the polyisocyanate is isophorone diisocyanate and the polyol is a polyacrylate polyol with an hydroxyl functionality greater than 2.

12. An electrochromic layer according to claim 11 wherein the polyacrylate polyol is a polymer formed from a mono hydroxy caprolactone acrylate.

13. An electrochromic layer according to claim 10 wherein the polyisocyanate is selected from the group consisting of the polyisocyanate containing biuret groups, and the polyisocyanate containing an isocyanurate ring and the polyol is selected from the group consisting of polyester polyols and polyether polyols.

14. An electrochromic layer according to claim 13 wherein the polyol is selected from the group consisting of a polyol made from diethylene glycol and adipic acid, and a polyol made from diethylene glycol, adipic acid and trimethylol propane.

15. An electrochromic layer according to claim 8 wherein the polyol polymer chains are cross-linked by reaction with a metal alkoxide.

16. An electrochromic layer according to claim 15 wherein the metal alkoxide is tetramethyl orthosilicate.

17. An electrochromic layer according to claim 16 wherein the polyol is a polymer formed from a mono hydroxy caprolactone-monoacrylate.

18. An electrochromic layer according to claim 8 wherein the polyol polymer has an hydroxyl functionality greater than 2 and the polyol polymer chains are cross-linked by reaction with a bisketene.

19. An electrochromic layer according to claim 18 wherein the bisketene is 9,10-hydroanthracene-9,10-bisketene.

20. An electrochromic layer according to claim 19 wherein the polyol is a polymer formed from a mono hydroxy caprolactone-monoacrylate.

21. An electrochromic layer according to any one of claims 1–20 wherein, in the electrochromic solution, the solvent is a liquid at room temperature and is selected from the group consisting of acetonitrile, propionitrile, dimethylformamide, dimethylsulfoxide, glutaronitrile, propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, and gamma-valerolactone with ethylene carbonate.

22. An electrochromic layer according to any one of claims 1–20 wherein, in the electrochromic solution, the solvent is selected from the group consisting of propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, and gamma-valerolactone with ethylene carbonate.

23. An electrochromic layer according to any one of claims 1–20 wherein, in the electrochromic solution, the solvent is propylene carbonate.

24. An electrochromic layer of claim 1 which is formed in situ within an electrochromic device after a precursor composition, which comprises in combination the electrochromic solution and precursors of the polymers, is loaded into the device.

25. An electrochromic layer according to claim 1 wherein the solution comprises at least 50% by weight of the layer and less than the percentage by weight of the layer at which at room temperature formation of a free-standing gel does not occur.

26. An electrochromic layer according to claim 1 which is self-erasing.

27. An electrochromic layer according to claim 1 wherein the electrochromic solution comprises a tinting compound.

28. An electrochromic layer according to claim 9 wherein the reaction between the polyol and the polyisocyanate is catalyzed by a catalyst selected from the group consisting of tin-based polyurethane polymerization catalysts, platinum-based polyurethane polymerization catalysts, and amine-based polyurethane polymerization catalysts.

29. An electrochromic layer according to claim 28 wherein the catalyst employed in the polymerization is selected from the group consisting of dibutyltin dilaurate and dibutyltin diacetate.

30. An electrochromic layer according to claim 1 which is self-erasing and wherein the electrochromic solution comprises (A) a solvent;

(B) at least one cathodic electrochromic compound which, in a voltammogram done in the solvent at room temperature, displays at least two chemically reversible reduction waves;

(C) at least one anodic electrochromic compound which, in a voltammogram done in the solvent at room temperature, displays at least two chemically reversible oxidation waves; and (D) if all cathodic and anodic compounds in their zero-potential equilibrium states in solution in the solvent are not ionic, an inert current-carrying electrolyte.

31. An electrochromic layer according to claim 9 which is self-erasing and wherein the electrochromic solution comprises (A) a solvent;
(B) at least one cathodic electrochromic compound which, in a voltammogram done in the solvent at room temperature, displays at least two chemically reversible reduction waves;
(C) at least one anodic electrochromic compound which, in a voltammogram done in the solvent at room temperature, displays at least two chemically reversible oxidation waves; and
(D) if all cathodic and anodic compounds in their zero-potential equilibrium states in solution in the solvent are not ionic, an inert current-carrying electrolyte.

32. An electrochromic layer according to claim 11 which is self-erasing and wherein the electrochromic solution comprises (A) a solvent;
(B) at least one cathodic electrochromic compound which, in a voltammogram done in the solvent at room temperature, displays at least two chemically reversible reduction waves;
(C) at least one anodic electrochromic compound which, in a voltammogram done in the solvent at room temperature, displays at least two chemically reversible oxidation waves; and
(D) if all cathodic and anodic compounds in their zero-potential equilibrium states in solution in the solvent are not ionic, an inert current-carrying electrolyte.

33. An electrochromic layer according to claim 13 which is self-erasing and wherein the electrochromic solution comprises (A) a solvent;
(B) at least one cathodic electrochromic compound which, in a voltammogram done in the solvent at room temperature, displays at least two chemically reversible reduction waves;
(C) at least one anodic electrochromic compound which, in a voltammogram done in the solvent at room temperature, displays at least two chemically reversible oxidation waves; and
(D) if all cathodic and anodic compounds in their zero-potential equilibrium states in solution in the solvent are not ionic, an inert current-carrying electrolyte.

34. An electrochromic layer according to claim 16 which is self-erasing and wherein the electrochromic solution comprises (A) a solvent;
(B) at least one cathodic electrochromic compound which, in a voltammogram done in the solvent at room temperature, displays at least two chemically reversible reduction waves;
(C) at least one anodic electrochromic compound which, in a voltammogram done in the solvent at room temperature, displays at least two chemically reversible oxidation waves; and
(D) if all cathodic and anodic compounds in their zero-potential equilibrium states in solution in the solvent are not ionic, an inert current-carrying electrolyte.

35. An electrochromic layer according to claim 18 which is self-erasing and wherein the electrochromic solution comprises (A) a solvent;
(B) at least one cathodic electrochromic compound which, in a voltammogram done in the solvent at room temperature, displays at least two chemically reversible reduction waves;
(C) at least one anodic electrochromic compound which, in a voltammogram done in the solvent at room temperature, displays at least two chemically reversible oxidation waves; and
(D) if all cathodic and anodic compounds in their zero-potential equilibrium states in solution in the solvent are not ionic, an inert current-carrying electrolyte.

36. An electrochromic layer according to any one of claims 30–35 wherein there is one anodic electrochromic compound, which is selected from the group consisting of 5,10-dihydro-5,10-dimethylphenazine, N,N,N'.N'-tetramethyl-p-phenylene-diamine, N,N,N', N'-tetraphenyl-p-phenylene-diamine, bis-3,3'-diethyl-2, 2'-benzothiazole azine, and tetrathiafulvalene.

37. An electrochromic layer according to claim 36 wherein there is one anodic electrochromic compound, which is 5,10-dihydro-5,10-dimethylphenazine.

38. An electrochromic layer according to any one of claims 30–35 wherein there is one cathodic electrochromic compound, which is a salt of a dication selected from the group consisting of N, N'-substituted dipyridyls with hydrogen at all of the 2, 2', 6, and 6' positions and with the N and N' substituents being the same or different and each being selected from the group consisting of alkyl groups of 1–10 carbons, phenyl, benzyl, 2-phenylethyl, 3-phenyl(n-propyl), and 4-phenyl(n-butyl) and N, N'-substituted dipyridyls with an alkyl group of 1–4 carbons at each of the 2, 2', 6, and 6' positions and with the N and N' substituents being the same or different and each being selected from the group consisting of alkyl groups of 1–10 carbons, benzyl, 2-phenylethyl, 3-phenyl(n-propyl), and 4-phenyl(n-butyl).

39. An electrochromic layer according to claim 36 wherein there is one cathodic electrochromic compound, which is a salt of a dication selected from the group consisting of N, N'-substituted dipyridyls with hydrogen at all of the 2, 2', 6, and 6' positions and with the N and N' substituents being the same or different and each being selected from the group consisting of alkyl groups of 1–10 carbons, phenyl, benzyl, 2-phenylethyl, 3-phenyl(n-propyl), and 4-phenyl(n-butyl) and N, N'-substituted dipyridyls with an alkyl group of 1–4 carbons at each of the 2, 2', 6, and 6' positions and with the N and N' substituents being the same or different and each being selected from the group consisting of alkyl groups of 1–10 carbons, benzyl, 2-phenylethyl, 3-phenyl(n-propyl), and 4-phenyl(n-butyl).

40. An electrochromic layer according to claim 37 wherein there is one cathodic electrochromic compound, which is a salt of a dication selected from the group consisting of N, N'-substituted dipyridyls with hydrogen at all of the 2, 2', 6, and 6' positions and with the N and N' substituents being the same or different and each being selected from the group consisting of alkyl groups of 1–10 carbons, phenyl, benzyl, 2-phenylethyl, 3-phenyl(n-propyl), and 4-phenyl(n-butyl) and N, N'-substituted dipyridyls with an alkyl group of 1–4 carbons at each of the 2, 2', 6, and 6' positions and with the N and N' substituents being the same or different and each being selected from the group consisting of alkyl groups of 1–10 carbons, benzyl, 2-phenylethyl, 3-phenyl(n-propyl), and 4-phenyl(n-butyl).

41. An electrochromic layer according to claim 40 wherein the cathodic electrochromic compound is a salt of 1,1'-di(3-phenyl(n-propyl))-4, 4'-dipyridinium.

42. An electrochromic layer according to claim 41 wherein the salt is the difluoroborate.

43. An electrochromic layer according to claim 39 wherein, in the electrochromic solution, the solvent is selected from the group consisting of propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, and gamma-valerolactone with ethylene carbonate.

44. An electrochromic layer according to claim 40 wherein, in the electrochromic solution, the solvent is selected from the group consisting of propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, and gamma-valerolactone with ethylene carbonate.

45. An electrochromic layer according to claim 41 wherein, in the electrochromic solution, the solvent is selected from the group consisting of propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, and gamma-valerolactone with ethylene carbonate.

46. An electrochromic layer according to claim 42 wherein, in the electrochromic solution, the solvent is selected from the group consisting of propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, and gamma-valerolactone with ethylene carbonate.

47. An electrochromic layer according to claim 43 wherein, in the electrochromic solution, the solvent is propylene carbonate.

48. An electrochromic layer according to claim 44 wherein, in the electrochromic solution, the solvent is propylene carbonate.

49. An electrochromic layer according to claim 45 wherein, in the electrochromic solution, the solvent is propylene carbonate.

50. An electrochromic layer according to claim 46 wherein, in the electrochromic solution, the solvent is propylene carbonate.

51. An electrochromic layer according to claim 1 wherein the electrochromic solution comprises a UV-stabilizing agent.

52. An electrochromic layer according to claim 51 wherein the UV-stabilizing agent is selected from the group consisting of ethyl 2-cyano-3,3-diphenyl acrylate, 2-ethylhexyl-2-cyano-3,3 diphenyl acrylate, 2-(2-hydroxy-4-methyl-phenyl)-benzo triazole, 2-hydroxy-4-methoxybenzophenone, and 2-ethyl-2'-ethoxyoxalanilide.

53. An electrochromic layer according to claim 52 wherein the UV-stabilizing agent is ethyl 2-cyano-3,3-diphenyl acrylate.

54. An electrochromic layer according to claim 1 wherein the electrochromic solution comprises a thickener, which is a non-cross-linked polymer.

55. An electrochromic layer according to claim 54 wherein the thickener is selected from the group consisting of polymethylmethacrylate, polyethylene oxide and polyvinylbutyral.

56. An electrochromic layer according to claim 55 wherein the thickener is polymethylmethacrylate.

57. An electrochromic device which comprises, as the medium of reversibly variable transmittance to light, an electrochromic layer of reversibly variable transmittance to light which comprises:

(a) a polymer matrix of a polyol polymer which has an hydroxyl functionality of at least 2 and wherein the polyol polymer chains are covalently cross-linked through hydroxyl groups; and (b) an electrochromic solution which comprises an anodic and a cathodic electrochromic compound interspersed in the polymer matrix.

58. An electrochromic device of claim 57 wherein, in the electrochromic solution of the electrochromic layer, the solvent is a liquid at room temperature and is selected from the group consisting of acetonitrile, propionitrile, dimethylformamide, dimethylsulfoxide, glutaronitrile, propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, and gamma-valerolactone with ethylene carbonate.

59. An electrochromic device of claim 58 wherein, in the electrochromic solution of the electrochromic layer, the solvent is selected from the group consisting of propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, and gamma-valerolactone with ethylene carbonate.

60. An electrochromic device of claim 59 wherein, in the electrochromic solution of the electrochromic layer, the solvent is propylene carbonate.

61. An electrochromic device of any one of claims 57–60 wherein the electrochromic layer is an electrochromic layer according to claim 9.

62. An electrochromic device of any one of claims 57–60 wherein the electrochromic layer is an electrochromic layer according to claim 11.

63. An electrochromic device of any one of claims 57–60 wherein the electrochromic layer is an electrochromic layer according to claim 13.

64. An electrochromic device of any one of claims 57–60 wherein the electrochromic layer is an electrochromic layer according to claim 16.

65. An electrochromic device of any one of claims 57–60 wherein the electrochromic layer is an electrochromic layer according to claim 18.

66. An electrochromic device of claim 61 wherein the electrochromic layer is self-erasing and wherein the solution of the layer comprises
  (A) at least one cathodic electrochromic compound which, in a voltammogram done in the solvent at room temperature, displays at least two chemically reversible reduction waves;
  (B) at least one anodic electrochromic compound which, in a voltammogram done in the solvent at room temperature, displays at least two chemically reversible oxidation waves; and
  (C) if all cathodic and anodic compounds in their zero-potential equilibrium states in solution in the solvent are not ionic, an inert current-carrying electrolyte.

67. An electrochromic device of claim 62 wherein the electrochromic layer is self-erasing and wherein the solution of the layer comprises
  (A) at least one cathodic electrochromic compound which, in a voltammogram done in the solvent at room temperature, displays at least two chemically reversible reduction waves;
  (B) at least one anodic electrochromic compound which, in a voltammogram done in the solvent at room temperature, displays at least two chemically reversible oxidation waves; and
  (C) if all cathodic and anodic compounds in their zero-potential equilibrium states in solution in the solvent are not ionic, an inert current-carrying electrolyte.

68. An electrochromic device of claim 63 wherein the electrochromic layer is self-erasing and wherein the solution of the layer comprises
  (A) at least one cathodic electrochromic compound which, in a voltammogram done in the solvent at room temperature, displays at least two chemically reversible reduction waves;
  (B) at least one anodic electrochromic compound which, in a voltammogram done in the solvent at room temperature, displays at least two chemically reversible oxidation waves; and
  (C) if all cathodic and anodic compounds in their zero-potential equilibrium states in solution in the solvent are not ionic, an inert current-carrying electrolyte.

69. An electrochromic device of claim 64 wherein the electrochromic layer is self-erasing and wherein the solution of the layer comprises
  (A) at least one cathodic electrochromic compound which, in a voltammogram done in the solvent at room temperature, displays at least two chemically reversible reduction waves;
  (B) at least one anodic electrochromic compound which, in a voltammogram done in the solvent at room temperature, displays at least two chemically reversible oxidation waves; and
  (C) if all cathodic and anodic compounds in their zero-potential equilibrium states in solution in the solvent are not ionic, an inert current-carrying electrolyte.

70. An electrochromic device of claim 65 wherein the electrochromic layer is self-erasing and wherein the solution of the layer comprises
  (A) at least one cathodic electrochromic compound which, in a voltammogram done in the solvent at room temperature, displays at least two chemically reversible reduction waves;
  (B) at least one anodic electrochromic compound which, in a voltammogram done in the solvent at room temperature, displays at least two chemically reversible oxidation waves; and
  (C) if all cathodic and anodic compounds in their zero-potential equilibrium states in solution in the solvent are not ionic, an inert current-carrying electrolyte.

71. A window which comprises, as the variable transmittance element, an electrochromic device which comprises, as the medium of reversibly variable transmittance to light, an electrochromic layer of reversibly variable transmittance to light which comprises:
  (a) a polymer matrix of a polyol polymer which has an hydroxyl functionality of at least 2 and wherein the polyol polymer chains are covalently cross-linked through hydroxyl groups; and
  (b) an electrochromic solution which comprises an anodic and a cathodic electrochromic compound interspersed in the polymer matrix.

72. A variable reflectance mirror which comprises, as the variable transmittance element, an electrochromic device which comprises, as the medium of reversibly variable transmittance to light, an electrochromic layer of reversibly variable transmittance to light which comprises:
  (a) a polymer matrix of a polyol polymer which has an hydroxyl functionality of at least 2 and wherein the polyol polymer chains are covalently cross-linked through hydroxyl groups; and
  (b) an electrochromic solution which comprises an anodic and a cathodic electrochromic compound interspersed in the polymer matrix.

73. An electrochromic layer of reversibly variable transmittance to light which comprises:
  (a) a polymer matrix of a polyol polymer which has an hydroxyl functionality of at least 2; and
  (b) an electrochromic solution which comprises at least one electrochromic compound interspersed in the polymer matrix.

74. An electrochromic layer according to claim 73 wherein the polyol polymer chains are covalently cross-linked through hydroxyl groups.

75. An electrochromic layer according to claim 73 where the polyol polymer is the product of monomers going through a chain lengthening polymerization prior to insertion into an electrochromic device and where the polyol polymer is crosslinked in situ within an electrochromic device.

76. An electrochromic layer according to claim 75 where the monomer chain lengthening takes place in the presence of an azo thermal initiator.

77. An electrochromic layer according to claim 76 wherein the polyol is a polyacrylate polyol.

78. An electrochromic layer according to claim 77 wherein the polyol is a polymer formed from a mono hydroxy caprolactone acrylate.

79. An electrochromic layer according to claim 73 wherein the polyol polymer is selected from the group consisting of a polyester polyol, a polyacrylate polyol and a polyether polyol.

80. An electrochromic layer according to claim 79 wherein the polyol polymer chains are cross-linked by reaction with a compound selected from the group consisting of an isocyanate with an isocyanate functionality of at least 2, a metal alkoxide with an alkoxide functionality of at least 2, and a bisketene, provided that, if the hydroxyl functionality of the polyol polymer is 2, the reaction is with a compound selected from the group consisting of a polyisocyanate with an isocyanate functionality of more than 2, a metal alkoxide with an alkoxide functionality of more than two.

81. An electrochromic layer according to claim 80 wherein there is one cathodic electrochromic compound, which is a salt of a dication selected from the group consisting of N, N'-substituted 4, 4'-dipyridyls with hydrogen at all of the 2, 2', 6, and 6' positions and with the N and N' substituents being the same or different and each being selected from the group consisting of alkyl groups of 1–10 carbons, phenyl, benzyl, 2-phenylethyl, 3-phenyl(n-propyl), and 4-phenyl (n-butyl) and N, N'-substituted dipyridyls with an alkyl group of 1–4 carbons at each of the 2, 2', 6, and 6' positions and with the N and N' substituents being the same or different and each being selected from the group consisting of alkyl groups of 1–10 carbons, benzyl, 2-phenylethyl, 3-phenyl(n-propyl), and 4-phenyl(n-butyl).

82. An electrochromic layer according to claim 81 wherein there is one anodic electrochromic compound, which is selected from the group consisting of 5,10-dihydro-5,10-dimethylphenazine, N,N,N',N'-tetramethyl-p-phenylene-diamine, N,N,N', N'-tetraphenyl-p-phenylene-diamine, bis-3,3'-diethyl-2, 2'-benzothiazole azine, and tetrathiafulvalene.

83. An electrochromic layer according to claim 81 wherein there is one anodic electrochromic compound, which is 5,10-dihydro-5,10-dimethylphenazine.

84. An electrochromic layer according to claim 83 wherein the cathodic electrochromic compound is a salt of 1,1'-di(3-phenyl(n-propyl))-4,4'-dipyridinium.

85. An electrochromic layer according to claim 84 wherein the salt is the difluoroborate.

86. An electrochromic layer according to claim 84 wherein, in the electrochromic solution, the solvent is propylene carbonate.

87. An electrochromic device which comprises, as the medium of reversibly variable transmittance to light, the electrochromic layer of claim 84.

88. A variable transmittance electrochromic window which comprises, as the medium of reversibly variable transmittance to light, the electrochromic layer of claim 84.

89. An electrochromic layer according to claim 79 wherein the polyol polymer chains are cross-linked by reaction with a polyisocyanate.

90. An electrochromic layer according to claim 89 wherein the isocyanate is selected from the group consisting of isophorone diisocyanate, an isocyanate containing biuret groups, and an isocyanate containing an isocyanurate ring, and the polyol is selected from the group consisting of polyacrylate polyols, polyester polyols and polyether polyols.

91. An electrochromic layer according to claim 90 wherein the polyol is selected from the group consisting of the polyol made from diethylene glycol and adipic acid, and the polyol made from diethylene glycol, adipic acid and trimethylol propane.

92. An electrochromic layer according to claim 89 wherein the reaction between the polyol and the polyisocyanate is catalyzed by a catalyst selected from the group consisting of tin-based polyurethane polymerization catalysts, platinum-based polyurethane polymerization catalysts, and amine-based polyurethane polymerization catalysts.

93. An electrochromic layer according to claim 92 wherein the catalyst employed in the polymerization is selected from the group consisting of dibutyltin dilaurate and dibutyltin diacetate.

94. An electrochromic device which comprises, as the medium of reversibly variable transmittance to light, the electrochromic layer of claim 93.

95. A variable transmittance electrochromic window which comprises, as the medium of reversibly variable transmittance to light, the electrochromic layer of claim 93.

96. An electrochromic layer according to claim 79 wherein the polyol polymer chains are cross-linked by reaction with a metal alkoxide.

97. An electrochromic layer according to claim 96 wherein the metal alkoxide is tetramethyl orthosilicate.

98. An electrochromic layer according to claim 97 wherein the polyol is a polymer formed from a mono hydroxy caprolactone mono acrylate.

99. An electrochromic device which comprises, as the medium of reversibly variable transmittance to light, the electrochromic layer of claim 98.

100. A variable transmittance electrochromic window which comprises, as the medium of reversibly variable transmittance to light, the electrochromic layer of claim 98.

101. An electrochromic layer according to claim 79 where the monomer chain lengthening takes place in the presence of an azo thermal initiator.

102. An electrochromic layer according to claim 101 wherein the polyol is a polyacrylate polyol.

103. An electrochromic layer according to claim 102 wherein the polyol is a polymer formed from a mono hydroxy caprolactone mono acrylate.

104. An electrochromic layer according to claim 79 wherein the polyol polymer has an hydroxyl functionality greater than 2 and the polyol polymer chains are cross-linked by reaction with a ketene having a functionality of at least two.

105. An electrochromic layer according to claim 104 wherein the bisketene is 9, 10-hydroanthracene-9, 10-bisketene.

106. An electrochromic layer according to claim 104 where electrochromic layer is catalyst-free.

107. An electrochromic device which comprises, as the medium of reversibly variable transmittance to light, the electrochromic layer of claim 104.

108. A variable transmittance electrochromic window which comprises, as the medium of reversibly variable transmittance to light, the electrochromic layer of claim 104.

109. An electrochromic layer according to claim 79 wherein, in the electrochromic solution, the solvent is a liquid at room temperature and is selected from the group consisting of acetonitrile, propionitrile, dimethylformamide, dimethylsulfoxide, glutaronitrile, propylene carbonate, isobutylene carbonate, gamma-butyrolactone, gamma-valerolactone, any homogeneous mixture that is liquid at room temperature of any two or more of propylene carbonate, isobutylene carbonate, gamma-butyrolactone, and gamma-valerolactone, and any homogenous mixture that is liquid at room temperature of any one or more of propylene carbonate, isobutylene carbonate, gamma-butyrolactone, gamma-valerolactone and ethylene carbonate.

110. An electrochromic layer according to claim 109 wherein the solution comprises at least 50% by weight of the layer and less than the percentage by weight of the layer at which at room temperature formation of a free-standing gel does not occur.

111. An electrochromic layer according to claim 79 which is self-erasing.

112. An electrochromic device which comprises, as the medium of reversibly variable transmittance to light, the electrochromic layer of claim 79.

113. An electrochromic device according to claim 112 where the polyol polymer is the product of monomers going through a chain lengthening polymerization prior to insertion into an electrochromic device and where the polyol polymer is crosslinked within the electrochromic device.

114. A variable transmittance electrochromic window which comprises, as the medium of reversibly variable transmittance to light, the electrochromic layer of claim 79.

115. An electrochromic window according to claim 114 where the polyol polymer is the product of monomers going through a chain lengthening polymerization prior to insertion into an electrochromic window and where the polyol polymer is crosslinked within the electrochromic window.

116. An electrochromic layer of reversibly variable transmittance to light which comprises:

(a) a solvent (b) a polymer matrix, where the polymer matrix comprises a cross-linked polyol polymer having a hydroxyl functionality of at least 2 and where, prior to crosslinking, the polyol polymer is formed in the solvent by polymerization of a monomer; and (c) at least one electrochromic compound interspersed in the polymer matrix and the solvent.

117. An electrochromic layer according to claim 116 where the monomer is polymerized prior to insertion into an electrochromic device and where the polyol polymer is crosslinked within the electrochromic device.

118. An electrochromic layer according to claim 117 where the monomer polymerization takes place in the presence of an azo thermal initiator.

119. An electrochromic layer according to claim 118 wherein the polyol is a polyacrylate polyol.

120. An electrochromic layer according to claim 119 wherein the polyol is a polymer formed from a mono hydroxy caprolactone acrylate.

* * * * *